June 21, 1966  R. W. HANSEN  3,257,590
VACUUM VARIABLE CAPACITOR
Filed June 26, 1962
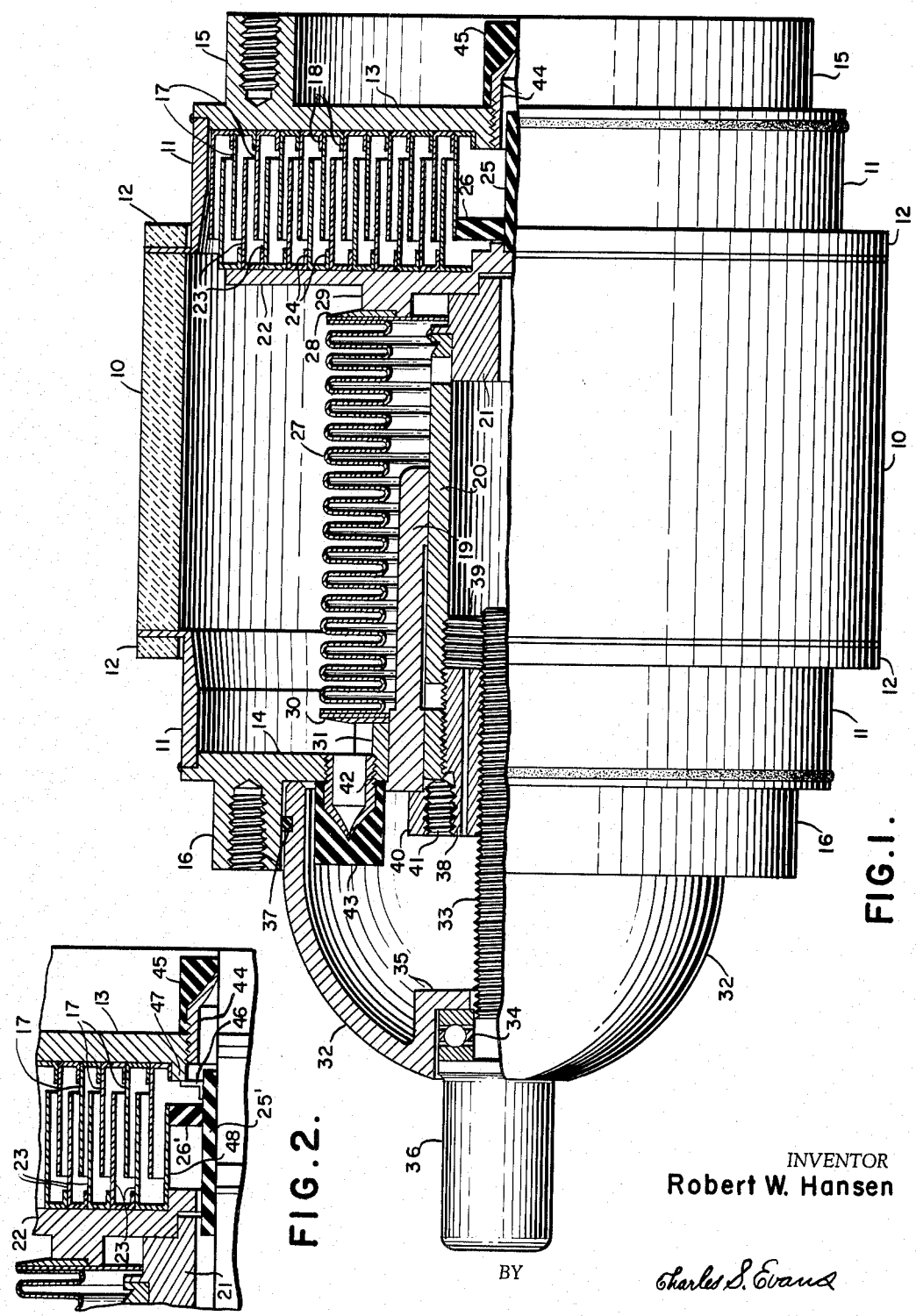
INVENTOR
Robert W. Hansen
BY *Charles S. Evans*
ATTORNEY

United States Patent Office 3,257,590
Patented June 21, 1966

3,257,590
VACUUM VARIABLE CAPACITOR
Robert W. Hansen, San Jose, Calif., assignor to Jennings Radio Manufacturing Corporation, San Jose, Calif., a corporation of Delaware
Filed June 26, 1962, Ser. No. 205,334
8 Claims. (Cl. 317—245)

This invention relates to vacuum variable capacitors and more particularly to the mounting of the movable capacitor plates therein.

The vacuum variable capacitor of this invention includes a vacuumized envelope having a fixed electrode and a movable electrode mounted therein. Each of these electrodes comprises a plurality of concentric spaced-apart rings or plates, and the rings of the movable electrode interleave with the rings of the fixed electrode a variable amount to change the capacitance of the unit. It is very important to maintain the concentric accuracy of these interleaving rings to ensure proper performance of the capacitor, and it is important to be able to set the opposed electrodes precisely to obtain maximum capacity from the capacitor.

Accordingly, it is a principal object of this invention to provide a vacuum variable capacitor having improved mounting means for the movable electrode.

It is a further object of this invention to provide a capacitor having a bearing assembly for accurately supporting the movable electrode.

It is a still further object of this invention to provide a capacitor having adjustment means for precise determination of a pre-selected maximum capacity independent of the actuating shaft which effects setting of the electrodes to such pre-selected maximum capacity position.

It is an even further object of this invention to provide a compact capacitor of rugged construction which will give years of trouble-free service to the user thereof. These and other objects and advantages of the invention will be readily apparent from the following specification wherein like numerals refer to similar parts throughout.

Referring to the drawings:

FIGURE 1 is a partial sectional view and a partial elevation of the vacuum variable capacitor of this invention; and FIGURE 2 is a fragmentary sectional view of a second embodiment of a bearing assembly for supporting the movable electrode from one end of the envelope.

Referring to FIGURE 1, the vacuum variable capacitor of this invention comprises a ceramic cylinder 10 metallized at both ends thereof and sealed to a pair of seal rings 11. Ceramic back-up rings 12 are brazed to the outwardly extending flanges of the rings 11 to add strength to this joint. Attached to the free ends of the rings 11 are a first end wall 13 and a second end wall 14. These parts, as well as all other metal parts in the capacitor, are preferably secured together by heliarcing, which is an electric weld formed in a helium atmosphere. Integral with the walls 13 and 14 are annular ribs 15 and 16, respectively, each having a plurality of threaded bores therein which serve to provide a mounting means for the capacitor.

The fixed electrode comprises a plurality of concentric spaced-apart capacitor rings or plates 17, each brazed to the inside face of the end wall 13. These rings are maintained in their concentric relationship by forming each ring with a U-shaped portion at one end thereof. This portion includes a reentrant flange 18 adapted to receive snugly the outside surface of the next successively smaller ring. This form of construction provides an electrode of extremely rigid construction ensuring a high degree of concentric accuracy between the capacitor plates thereof.

Actually, the rings or plates 17 are very thin and very close together. Because of physical limitations in the drawing, these rings are necessarily shown with a greater degree of thickness and are spaced apart a considerable distance.

The second end wall 14 contains a large central opening and tightly fitted therein is an axially extending sleeve 19. Slidably disposed in the sleeve 19 is a hollow stem 20 having a ring 21 attached to the inner end thereof. A solid circular plate 22 is secured to the ring 21; the plate 22 has a central recess adapted to receive tightly a boss on the outer side of the ring 21.

The movable electrode comprises a plurality of concentric spaced-apart capacitor rings or plates 23 each brazed to the face of the plate 22 opposing the end wall 13 and having reentrant flanges 24. The rings 23 are identical to the rings 17, although oppositely disposed thereto, and the rings 23 are adapted to interleave with the rings 17 in a spaced apart manner. The spacing of one set of capacitor rings with respect to the other set of rings is very close and this spacing is quite critical. Since the movable set of rings 23 is mounted on the extreme inner end of an elongated stem 20, there is some tendency for this set of rings to swing closer or otherwise shift transversely to the fixed rings 17, depending on the disposition and manner in which the capacitor is mounted and physical impacts that it might receive. To ensure the proper functioning of the capacitor, radial or lateral movement of the movable rings 23 must be prevented.

Radial movement of the movable electrode is prevented by providing bearing for the inner end of the stem 20 which supports and moves the movable rings 23. This bearing includes a bearing shaft 25 of dielectric material secured to the central portion of the plate 22 and extending coaxially with the hollow stem 20. An annular bearing 26 of dielectric material is attached to the innermost ring 17 of the fixed electrode, and this bearing 26 is adapted to slidably receive the shaft 25. The innermost ring 17 to which the bearing 26 is attached may be made more sturdy than the other rings to provide a firm support for this bearing. Preferably, the shaft 25 and bearing 26 are machined to very close tolerances providing a low tolerance slidable fit between these two members. It should be readily apparent that by this construction radial movement of the movable rings 23 is precluded. Since the fixed rings 17 are attached to the rigid end wall 13, the accurate spacing between the movable and fixed sets of capacitor rings can be maintained.

A bellows 27 is interposed between the second end wall 14 and the movable electrode to achieve and maintain the vacuumized condition in the variable capacitor. One end of the bellows 27 is attached to a thin ring 28 which is in turn secured to an annular rib 29 integral with the plate 22. The other end of the bellows 27 is attached to a similar thin ring 30 which is in turn secured to an annular flange 31 integral with the end wall 14 and extending inwardly therefrom at its central opening. Thus the bellows closes the vacuumized envelope of the capacitor, and it expands and contracts with the movement of the electrode to which it is connected.

A dome-like cap 32 adapted to be received within the annular rib 16 of the second end wall 14 has a central opening for rotatably receiving a long screw member 33. A ball bearing assembly 34 received in a recess 35 in the cap 32 supports the screw 33 by engaging a hub portion 36 thereof. Rotary movement is imparted to the screw 33 by the application of any suitable driving means to the hub 36. An O-ring 37 received in an annular groove in the cap 32 is provided to form a seal between the cap and the end wall 14.

Rotary movement of the screw 33 imparts axial movement to the stem 20 having the movable electrode secured thereto thereby varying the capacitance figure. The stem 20 and the rings 23 are prevented from rotating along with the screw 33 by the bellows 27 which is attached at one of its ends to the plate 22 and at its other end to the end wall 14.

Means are provided in the vacuum variable capacitor of this invention to set precisely maximum capacity of the same after the entire unit has been assembled. This is accomplished by an adjustment sleeve 38 threadably engageable with the screw 33 and a threaded portion 39 in the inside of the stem 20. The adjustment sleeve 38 contains a flange 40 having one face thereof adapted to engage the outer end of the sleeve 19; this flange acts as a stop to limit inward movement of the stem 20 and the movable electrode attached thereto. A set-screw 41 threadable in a bore in the flange 40 is provided to lock the adjustment sleeve 38 to the stem 20. This is accomplished by frictional engagement of the end of the set-screw 41 with the outer end of the stem 20.

The maximum capacity of the capacitor of this invention is precisely set in the following manner. After the capacitor is fully assembled, but before the cap 32 and screw 33 are in place, the movable capacitor rings 23 are interleaved in the fixed rings 17 to the position of maximum capacitance. This may be done by rotating the adjustment sleeve 38 while holding the flange 40 thereof in engagement with the end of the sleeve 19. When the rings 23 are in their desired position, the set-screw 41 is rotated by an appropriate tool until its tip engages the end of the stem 20. With the adjustment sleeve 38 and its flange 40 locked to the stem 20, the flange 40 acts as a stop limiting further inward movement of the stem 20 and the movable rings 23. Thus, when the screw 33 and cap 32 are in place, rotation of the screw 33 in one direction will bring the flange 40 into engagement with the sleeve 19 resulting in a precise maximum capacitance setting.

A pair of tubulations or tip-offs are provided to seal the envelope of the capacitor after it has been placed in a vacuumized condition. One tip-off 42 is threadably engaged in an aperture in the second end wall 14. A cover 43 of rubber or the like may be used to protect the tip-off after it has been sealed. A second tip-off 44 is provided in a central opening in the first end wall 13; this tip-off has a diameter large enough to provide an adequate annular space around the bearing shaft 25. A cover 45, similar to the cover 43, is provided for the tip-off 44. It has been found desirable to use two tip-offs to permit the drawing of washing and cleaning solutions through the capacitor before the same is vacuumized and sealed. After the capacitor has been cleaned, one tip-off is sealed, a vacuum is applied, and the other tip-off is then sealed.

FIGURE 2 shows a second embodiment of the bearing for the inner end of the hollow stem 20 which supports and moves the movable rings 23. In this embodiment a dielectric bearing shaft 25' is secured to a ring 46 which is in turn attached to a central annular rib 47 integral with the end wall 13. The ring 46 may contain a number of openings in its vertical leg or it may not be a continuous member to allow the tip-off 44 to communicate with the vacuum envelope of the capacitor. An annular dielectric bearing collar 26' is attached to a reentrant flange 48 of the innermost ring 23 of the movable electrode, and this bearing is adapted to fit closely and slide on the bearing shaft 25'. It will be readily apparent that by this construction radial movement of the movable rings 23 will be precluded.

It is to be understood that the embodiments shown are for the purpose of example only, in that other modifications thereof will fall within the scope of the appended claims.

I claim:

1. A vacuum variable capacitor comprising a vacuumized envelope, a first end wall closing one end of the envelope and having a fixed annular electrode on the inside face thereof, a second end wall closing the other end of the envelope and having a centrally disposed sleeve secured thereto, a stem axially slidable in said sleeve thereby forming a first bearing assembly, said sleeve having an axially movable annular electrode on the inner end thereof, a seal interposed between said movable electrode and said second end wall, fixed bearing means centrally secured to the inside face of said first end wall and a movable bearing means extending axially from the inner end of said stem and slidably disposed with respect to said fixed bearing means thereby forming a second bearing assembly at the center of said fixed annular electrode, said fixed bearing means and said movable bearing means of second bearing assembly cooperating together totally within said vacuumized envelope, adding stability and preventing radial movement of the axially movable annular electrode with respect to the fixed annular electrode.

2. A vacuum variable capacitor comprising a vacuumized envelope, a first end wall closing one end of the envelope and having a fixed electrode on the inside face thereof, a second end wall closing the other end of the envelope and having a centrally disposed sleeve secured thereto, a stem axially slidable in said sleeve thereby forming a first bearing assembly, said sleeve having an axially movable electrode on the inner end thereof, a bellows interposed between said movable electrode and said second end wall, an annular bearing centrally secured to the inside face of said first end wall, and a bearing shaft extending axially from the inner end of said stem and slidable in said annular bearing thereby forming a second bearing assembly at the center of said fixed annular electrode, said fixed bearing means and said movable bearing means of the second bearing assembly cooperating together totally within said vacuumized envelope, adding stability and preventing radial movement of the axially movable annular electrode with respect to the fixed annular electrode.

3. A vacuum variable capacitor comprising a vacuumized envelope, a first end wall closing one end of the envelope and having a fixed annular electrode on the inside face thereof, a second end wall closing the other end of the envelope and having a centrally disposed sleeve secured thereto, a stem axially slidable in said sleeve thereby forming a first bearing assembly, said sleeve having an axially movable annular electrode on the inner end thereof, a bellows interposed between said movable electrode and said second end wall, a bearing shaft centrally secured to the inside face of said first end wall and an annular bearing collar coaxial with said stem and extending inwardly therefrom, said annular bearing collar being slidable on said bearing shaft whereby to form a second bearing assembly at the center of said fixed annular electrode, said second bearing assembly being within the vacuumized envelope at the center of the fixed annular electrode, adding stability to the movable annular electrode and preventing radial movement of the axially movable annular electrode.

4. A vacuum variable capacitor comprising a cylindrical vacuumized envelope, a first end wall closing one end of the envelope and having a fixed electrode on the inside face thereof, said fixed electrode comprising a plurality of concentric spaced-apart ring members each secured at one end thereof to said first end wall, a second end wall closing the other end of the envelope and having a centrally disposed sleeve extending normally therefrom, a stem axially slidable in said sleeve thereby forming a first bearing assembly, said sleeve having a plate secured normally at the inner end thereof, an axially movable electrode comprising a plurality of concentric spaced-apart ring members each secured at one end thereof to said plate and adapted for interleaving engagement with the rings of said fixed electrode, a bellows interposed between said movable electrode and said second end wall, an annular bearing concentric with the rings of said fixed electrode and secured within the innermost of the rings thereof, and a bearing shaft extending axially from the inner end of said stem and slidable in said annular bearing to form a second bearing assembly, said second bearing assembly being totally within the vacuumized envelope and closely adjacent the fixed electrode and preventing radial movement of the axially movable electrode.

5. A vacuum variable capacitor comprising a cylindrical vacuumized envelope, a first end wall closing one end of the envelope and having a fixed electrode on the inside face thereof, said electrode comprising a plurality of concentric spaced-apart ring members each secured at one end thereof to said first end wall, a second end wall closing the other end of the envelope and having a centrally disposed sleeve extending normally therefrom, a stem axially slidable in said sleeve to form a first bearing assembly, said stem having a plate secured normally at the inner end thereof, an axially movable electrode comprising a plurality of concentric spaced-apart ring members each secured at one end thereof to said plate and adapted for interleaving engagement with the rings of said fixed electrode, a bellows interposed between said movable electrode and said second end wall, a bearing shaft concentric with the rings of said fixed electrode and secured within the innermost of the rings thereof, and an annular bearing coaxial with said stem and extending inwardly therefrom, said annular bearing being slidable on said bearing shaft to form a second bearing assembly, said second bearing assembly being within said vacuumized envelope and closely adjacent the fixed electrode and preventing radial movement of said axially movable electrode.

6. A vacuum variable capacitor comprising a cylindrical vacuumized envelope, a first end wall closing one end of the envelope and having a fixed electrode on the inside face thereof, a second end wall closing the other end of the envelope and having a centrally disposed sleeve secured normally thereto, a hollow stem axially slidable in said sleeve and having a movable electrode on the inner end thereof, said hollow stem being interiorly threaded at the end thereof adjacent said second wall, a seal interposed between said movable electrode and said second end wall, a screw rotatable in a central opening in said second end wall and extending concentrically spaced within the threaded portion of said hollow stem, a selectively adjustable annular sleeve disposed in the annular space between said hollow stem and said screw and being threadably engageable with said screw and with the threaded inside of said hollow stem whereby rotation of said adjustment sleeve moves said hollow stem axially relative to said screw, and means for selectively locking said adjustment sleeve to said hollow stem to prevent rotatable adjustment of the sleeve.

7. A vacuum variable capacitor comprising a cylindrical vacuumized envelope, a first end wall closing one end of the envelope and having a fixed electrode on the inside face thereof, a second end wall closing the other end of the envelope and having a centrally disposed sleeve secured normally thereto, a hollow stem axially slidable in said sleeve and having an axially movable electrode on the inner end thereof, said hollow stem being internally threaded the end near said second wall, a seal interposed between said movable electrode and said second end wall, an annular fixed bearing means centrally secured to the inside of said first end wall, a bearing means extending axially from the inner end of said hollow stem and slidably engaging said annular fixed bearing means all within said vacuumized envelope and closely adjacent said fixed electrode to prevent radial movement of said axially movable electrode, a screw rotatable in a central opening in said second end wall and extending concentrically spaced within said hollow stem, an adjustment sleeve threaded exteriorly and interiorly and disposed in the annular space between said hollow stem and said screw and being threadably engageable with said screw and with the inside of said hollow stem whereby rotation of said screw slides said hollow stem axially in said first mentioned sleeve and said bearing shaft in said annular bearing and means normally locking said adjustment sleeve to said hollow stem to prevent rotation of the adjustment sleeve relative to the hollow stem, said adjustment sleeve having a radial flange for abutment against an adjacent end of said sleeve to limit the travel of said hollow stem and said adjustment sleeve when locked together.

8. A vacuum variable capacitor comprising a cylindrical vacuumized envelope, a first end wall closing one end of the envelope and having a fixed electrode on the inside face thereof, a second end wall closing the other end of the envelope and having a centrally disposed sleeve secured normally thereto, a hollow stem slidable in said sleeve and having a movable electrode on the inner end thereof, a seal interposed between said movable electrode and said second end wall, a screw rotatable in a central opening in said second end wall and extending concentrically within said hollow stem, and adjustment means for adjusting said hollow stem axially relative to said screw said adjustment means being interiorly and exteriorly threaded and having a radially extending flange at one end engageable with the end of said sleeve adjacent the second wall of the envelope, said adjustment means having its exterior threads threadedly engaging the inside of said hollow stem and its inside threads engaging the threaded screw, said adjustment means having a threaded aperture extending through said flange approximately parallel to the axis of said adjustable means and adjacent an end of said stem, and a screw received in said threaded aperture for abutment against the adjacent end of said stem whereby the adjustment means is locked to said stem, said flange in abutting said sleeve limiting the movement of said adjustment means and stem in one direction.

References Cited by the Examiner

UNITED STATES PATENTS

| 1,552,185 | 9/1925 | Alcox | 317—253 |
| 1,625,330 | 4/1927 | Pinkus | 317—251 |
| 2,899,612 | 8/1959 | Jennings | 317—245 |
| 2,920,255 | 1/1960 | Luft | 317—251 |

ROBERT K. SCHAEFER, *Primary Examiner.*

E. JAMES SAX, LARAMIE E. ASKIN, JOHN F. BURNS, *Examiners.*

E. GOLDBERG, *Assistant Examiner.*